Patented Feb. 20, 1940

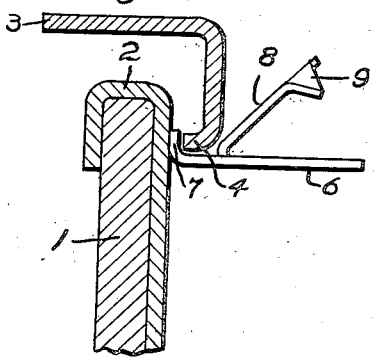
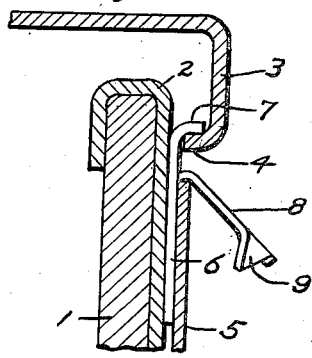
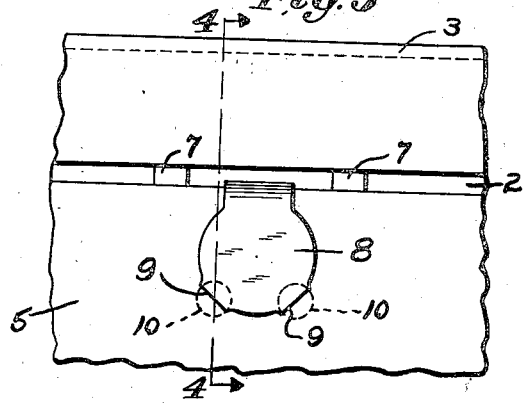
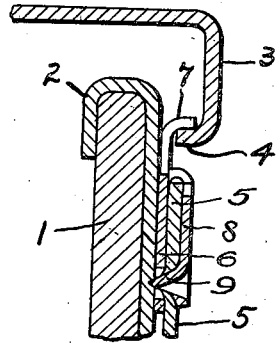
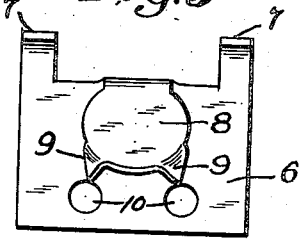
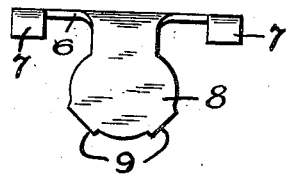
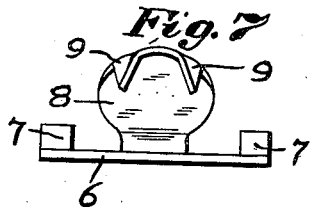

2,191,430

UNITED STATES PATENT OFFICE 2,191,430

SLIP COVER INSTALLATION, FASTENER FOR THE SAME, AND METHOD OF ATTACHING SAME

Walter I. Jones, Arlington, Mass., assignor to United-Carr Fastener Corporation, Cambridge, Mass., a corporation of Massachusetts Application February 3, 1937, Serial No. 123,883

3 Claims. (Cl. 45—138)

My invention aims to provide improvements in slip cover installations, fasteners for the same and the method of attaching the fastener to the installation.

Referring to the drawing which illustrates a preferred embodiment of my invention:

Figure 1 is a vertical section through a portion of an installation showing the relation of the parts, except for the slip cover, at the beginning of the operation of attaching the fastener;

Fig. 2 is a section similar to that shown in Figure 1 except the fastener is shown in its final assembled position and the slip cover has been inserted beneath the clamping portion;

Fig. 3 is a front elevational view of a portion of a complete installation;

Fig. 4 is a section taken on the line 4—4 of Fig. 3;

Fig. 5 is a front elevation of the fastener clip before attachment;

Fig. 6 is a plan of the clip shown in Fig. 5; and

Fig. 7 is a bottom edge view of the clip shown in Fig. 5.

My invention, as illustrated by the annexed drawing, relates to the installation of a slip cover particularly in a motor vehicle body. The specific installation that I have selected for illustration of my invention is in connection with application of a slip cover to the inside of the door of an automobile. In the usual motor vehicle body construction the door is covered with an upholstered panel, the two sides and bottom of which may receive fasteners over their edges, and the top edge of which is overlapped by a portion of the molding which extends around the window in the door.

Referring now particularly to the drawing which has been selected to illustrate my invention, I have shown (Fig. 4) an upholstered door panel including the usual form piece 1 covered with a textile material 2 and overlapped at its upper edge by a suitably shaped molding 3 around the window opening in the door (not shown). The molding has a ledge portion 4 extending toward the upholstered panel the purposes of which will be more fully hereinafter described. It should be understood, however, that this ledge portion on the molding is present on the various types of motor vehicles now manufactured. The slip cover 5 is held in position adjacent to the upper edge of the upholstered panel by my novel fastener members engaged with the ledge 4 and operable as will be hereinafter described.

Fasteners for holding the slip cover adjacent to the sides and bottom of the upholstered panel may be of any suitable construction and my invention concerns only the fasteners for holding that edge of a slip cover which may be adjacent to a molding. My improved fastener, as illustrated, is formed from a single piece of metal and has a body portion 6, a pair of hook-shaped portions 7 (Figs. 2 and 6), a bendable clamping portion 8 superposed above the body portion 6 and connected at one end thereto adjacent to where the hook portions 7—7 join the body portion 6 and prongs 9—9 preferably extending from the bendable clamping portion 8. The body portion 6 has cooperating apertures 10—10 (Figs. 3, 4 and 5) for receiving the ends of the prongs 9—9, as clearly shown in Fig. 4.

As far as I am aware, my fastener for holding the slip cover in place is new as well as the method of attaching the fastener. Since the fastener has hook portions 7—7 it can be secured to the ledge 4 of the molding 3 by placing the fastener in a position relative to the installation approximately as shown in Figure 1. In this manner the ends of the hook portions are first inserted between the upholstery covering 2 and the ledge 4. Then the operator merely presses the fastener toward the panel and the end of the hook 7 engages in back of the ledge 4 as shown in Fig. 2. When the fastener is in this position it cannot come loose and the slip cover may be inserted between the base portion 6 and the bendable clamping portion 8, as shown in Fig. 2. Thereafter the bendable portion 8 is forced against the slip cover in any suitable manner and the prongs 9—9 pierce the slip cover and enter the apertures 10—10 thereby securely holding the slip cover at its upper edge, as clearly shown in Fig. 4. An important feature of the construction of applicant's fastener is in the taking of the bendable portion from material at one end of the body portion and bending it so that it is superposed above the body portion thereby allowing the body portion to be free from apertures except those for reception of the prongs. With this construction the material of the slip covers can be tightly clamped between two solid surfaces, viz., the body portion 6 and the bendable portion 8, as best shown in Fig. 4.

I have found that the hook portions, as illustrated in the drawing, are of sufficient length and proper shape to permit attachment of the fasteners to practically all of the present day makes of motor vehicles by the method above described and without loosening the molding as has been necessary with other types of clips of which applicant is aware. My improved fastener is simple, relatively easy to manufacture, durable and has been found particularly adapted for the purpose for which it was constructed.

While I have illustrated and described a preferred embodiment of my invention, it should be understood that I do not wish to be limited thereby because the scope of my invention is best defined by the following claims.

I claim:

1. The combination with a vehicle body, having an upholstery panel, a molding overlapping a portion of said panel and a slip cover for covering said panel, of a fastener for the slip cover including a body portion, a hook-like portion hooked into engagement with said molding and a bendable clamping portion superposed above said body portion and connected to an outer edge thereof, said slip cover being gripped directly between said clamping portion and said body portion, said body portion having apertures and said clamping portion having prongs extending through the slip cover and into said apertures to prevent slipping of the slip cover from between the body portion and the clamping portion.

2. The combination with an upholstered member, a rigid member overlying a portion of said upholstered member, and a slip cover of a fastener for securing the slip cover in place over the upholstered member adjacent, said fastener having a body portion resting against the upholstery member, hook-like attaching means extending from said body portion beneath the overlying portion of said rigid member to hold said fastener in proper position and a bendable portion extending from said body portion over the edge of the slip cover and clamping the slip cover between it and the body portion of the fastener.

3. The combination with a vehicle body, having an upholstery panel, a molding overlapping a portion of said panel and a slip cover for covering said panel, of a fastener for the slip cover including a body portion, a hook-like means hooked into engagement with said molding and being the only means of the device located between the molding and the panel and a fastening means carried by said body portion and engaged with the slip cover to hold it in position relative to said upholstery panel, and said body portion being located between said panel and said slip cover.

WALTER I. JONES.